US006823467B1

(12) United States Patent
Cantrill

(10) Patent No.: US 6,823,467 B1
(45) Date of Patent: Nov. 23, 2004

(54) METHOD AND APPARATUS FOR ARBITRARY RESOLUTION INTERVAL TIMEOUTS

(75) Inventor: Bryan M. Cantrill, Menlo Park, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/512,842

(22) Filed: Feb. 25, 2000

(51) Int. Cl.[7] ............................ G06F 5/00; G06F 13/14
(52) U.S. Cl. ...................... 713/600; 713/400; 713/500; 713/502; 710/260; 710/263; 710/264; 710/266
(58) Field of Search ................................ 713/600, 400, 713/500, 502, 501, 503; 707/101; 710/260, 263, 264, 266; 711/108

(56) References Cited

U.S. PATENT DOCUMENTS

| | | | | |
|---|---|---|---|---|
| 5,276,847 A | * | 1/1994 | Kohn | 711/163 |
| 5,363,499 A | * | 11/1994 | Glass | 711/108 |
| 5,511,200 A | * | 4/1996 | Jayakumar | 710/266 |
| 5,832,492 A | * | 11/1998 | Wooten | 707/101 |
| 6,061,757 A | * | 5/2000 | Arimilli et al. | 710/264 |
| 6,065,077 A | * | 5/2000 | Fu | 710/100 |
| 6,163,839 A | * | 12/2000 | Janik et al. | 712/219 |
| 6,278,959 B1 | * | 8/2001 | Alferness | 702/186 |
| 6,408,324 B1 | * | 6/2002 | Wallace et al. | 718/107 |

FOREIGN PATENT DOCUMENTS

JP 08101803 A * 4/1996 ........... G06F/13/14

OTHER PUBLICATIONS

Zuberi, K.M.; Shin, K.G.; "Emeralds: a microkernel for embedded real–time systems", Real–Time Technology and Application Symposium, 1996. Proceedings., 1996 IEEE , Jun. 10–12, 1996, pp.: 241–249.*

Srinivasan et al., "A Firm Real–time System Implementation Using Commerical Off–the–Shelf Hardware and Free Software", Univ. of Kansas (1998) 8 pp.

* cited by examiner

Primary Examiner—Rehana Perveen
Assistant Examiner—James K. Trujillo
(74) Attorney, Agent, or Firm—Beyer Weaver & Thomas LLP

(57) ABSTRACT

Methods and apparatus for enabling timeouts with arbitrary resolutions to be implemented are disclosed. According to one aspect of the present invention, a method for enabling a device driver to communicate with a processor in a computing system includes exchanging information between the device driver and a clock system, and exchanging information between the clock system and a cyclic system. Information is also exchanged between the cyclic system and the processor. Although the clock system indirectly exchanges information with the processor, the clock system does not directly exchange information with the processor. In one embodiment, the clock system includes a callout system and a system clock, and exchanging information between the device driver and the clock system includes exchanging information between the system clock and the callout system, and exchanging information between the callout system and the device driver.

26 Claims, 12 Drawing Sheets

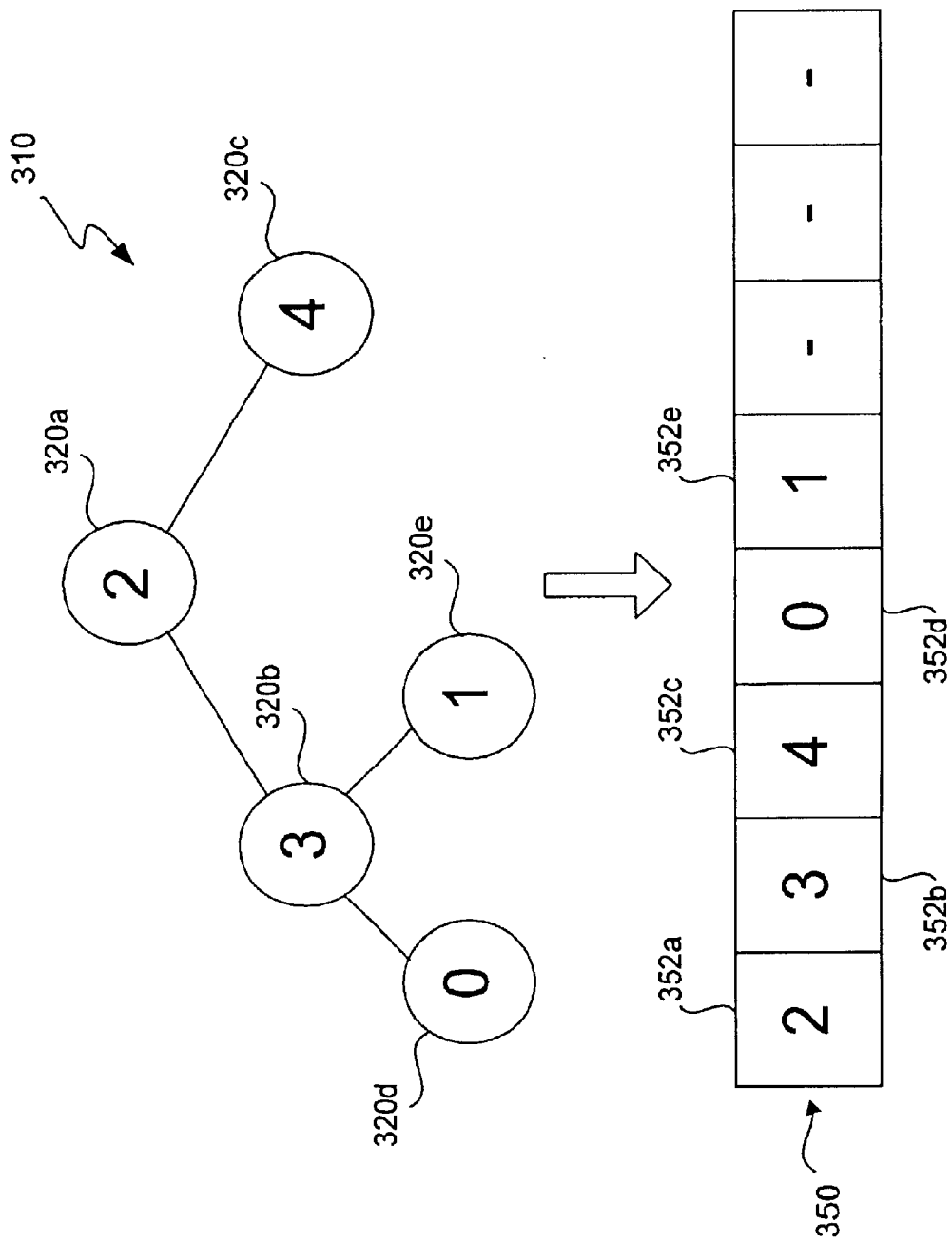

METHOD AND APPARATUS FOR ARBITRARY RESOLUTION INTERVAL TIMEOUTS

BACKGROUND OF THE INVENTION

1. Field of Invention The present invention relates generally to the resolution associated with a system clock in a computing system. More specifically, the present invention relates to a system which enables arbitrary resolution interval timeouts to be implemented.

2. Description of the Related Art

Computing systems are clock-driven systems in that a clock, i.e., a hardware clock, tracks time and sends out signals at specific intervals to cause actions within the computing systems. Operations performed on a processor of a computing system are typically only performed when initiated by a clock signal.

Many computing systems have a clock interrupt that fires at a constant rate, and is used to schedule system resources, perform accounting, and execute callouts, i.e., routines that execute on a given clock tick. A time increment may be specified within the system to implement a callout-based timer using the clock ticks. That is, a resolution of clock ticks and, hence, timeouts may be specified.

A system clock typically has multiple clients which use the system clock to implement a timer. By way of example, kernel timeout facilities are generally implemented as clients of a system clock. Such facilities are often insufficient for real-time demands. As will be appreciated by those skilled in the art, in addition to being characterized by a high latency as well as jitter, time out facilities based on a single system clock are also characterized by limited resolution, namely, that of the system clock.

FIG. 1 is a diagrammatic representation of the interaction between drivers for devices, a system clock, and a central processing unit (CPU). A computing system 102 includes a CPU 110 and various devices 120 that may include, but are not limited to, various computer peripherals, e.g., printers and monitors. Devices 120 have associated device drivers 130 which enable devices 120 to interface with CPU 110. Device drivers 130 are typically in communication with a timeout interface 140 that enables callouts to be executed. Timeout interface 140 communicates with a system clock 150 that communicates directly with CPU 110. As shown, within computing system 102, devices 120 are effectively clients of system clock 150.

The resolution of timeouts is typically limited by the resolution of the system clock of a computing system, e.g., system clock 150 of computing system 102. The system clock resolution generally defaults to a resolution of ten milliseconds (ms), or one hundred interrupts per second. The granularity of timeouts with a ten millisecond resolution, or a one hundred Hertz (Hz) rate, is often unacceptable for realtime applications.

Computing system 102 also generally includes other devices that require interval-based timers. For instance, clients 160 and 170 use interval-based timers. Clients 160 and 170, in addition to clients 180 and 185, use a realtime timeout interface 190 to interface with system clock 150. Realtime timeout interface 190 enables real time callouts to be made, and execute at a relatively high priority, while timeout interface 140 enables non-realtime callouts to be made from, for example, a thread that is running at the maximum priority of all system scheduling classes.

When a device, e.g., a peripheral device, that is supported by the computing system requires an internal timer at a different rate, such as a rate which is less than the default system clock resolution of ten milliseconds, the system clock rate may be tuned to meet the resolution required by the peripheral device. For instance, the system clock rate on a configurable system may be tuned to 1,000 Hz allowing for a one millisecond resolution.

While tuning the system clock may enable different interval timer rates to be supported, such tuning often results in undesirable side effects. By way of example, executing a clock interrupt up to ten times as often as typical may decrease overall system performance because of the increased interrupt load. The typically high level of a clock interrupt, coupled with the increased rate of timeouts may significantly increase interrupt latency, in addition to further decreasing system performance, as will be appreciated by those skilled in the art. Further, a one millisecond resolution is often still too coarse for many applications.

In many computing systems, devices with different interval timer requirements must often be supported by a single system clock. By way of example, a system may need to support a device with a timer rate of 433 Hz as well as a device with a timer rate of 60 Hz. In order to support more than one timer rate with the system clock, the system clock may be tuned, e.g., manually tuned, such that substantially arbitrary clock rates may be supported. As discussed above, increasing the timeout resolution may enable different devices to be supported. However, tuning the system clock generally does not allow timeouts for the different devices to be accurately set at a fine resolution. Tuning the system clock to a faster interrupt rate also results in increased latency and jitter within a computing system that supports multiple devices.

Some computing systems implement a timestamp-compare register for use with a timestamp register to enable arbitrary resolution timeouts, or interrupts. A timestamp register is typically a register which increments once per CPU cycle. For example, a timestamp register may increment 450 million times per second in a 450 MegaHertz (MHz) system. A timestamp-compare register is used to specify a time when a particular device requires a clock interrupt. When a comparison of the contents of the timestamp-compare register are found to equal the contents of a timestamp register, an interrupt is generated. Using a timestamp-compare register offers more flexibility than an internal-based piece of clock hardware, as the use of a timestamp-compare register generally does not force an operating system to choose a single interval. However, the use of a timestamp-compare register does not allow for dynamic time intervals to be implemented. Instead, the use of a timestamp-compare register typically implements static time intervals.

Therefore, what is desired is an efficient method for generating system timeouts or interrupts. That is, what is needed is a method for generating arbitrary resolution timeouts without incurring significant performance penalties, latency, or jitter.

SUMMARY OF THE INVENTION

The present invention relates to a system for enabling timeouts with arbitrary resolutions to be implemented which does not induce significant latency and jitter. According to one aspect of the present invention, a method for enabling a device driver to communicate with a processor in a computing system includes exchanging information between the device driver and a clock system, and exchanging information between the clock system and a cyclic system. Information is also exchanged between the cyclic system and the processor. Although the clock system indirectly exchanges information with the processor, the clock system does not directly exchange information with the processor.

The use of a clock system which does not exchange information directly with a processor and, instead, communicates with the processor through a cyclic system enables arbitrary timeouts to be implemented. Hence, access by clients to a processor may be unified. Further, by maintaining the clock system as a client of the cyclic system, legacy information associated with the overall computing system may be maintained.

In one embodiment, the clock system includes a callout system and a system clock, and exchanging information between the device driver and the clock system includes exchanging information between the system clock and the callout system, and exchanging information between the callout system and the device driver. In such an embodiment, the cyclic system includes an associated heap with a plurality of cyclics, and the method includes processing the heap to identify a cyclic that has an unexpired expiration time.

In another embodiment, the method may involve processing a lock-free software interrupt in a lock-free manner. Processing the software interrupt may include calling a handler associated with a cyclic. In still another embodiment, the method includes generating a clock interrupt using the cyclic system and the clock system.

According to another aspect of the present invention, a computing system that enables arbitrary resolution timeouts to be generated includes a first central processing unit and a memory, which includes a data structure, that is in communication with the first central processing unit. A cyclic system communicates with the first central processing unit and is arranged to maintain a heap of cyclics and to identify expiration times associated with the cyclics. A clock system of the computing system is in substantially direct communication with the cyclic system, and is not arranged to communicate directly with the first central processing unit. The computing system also includes a device driver that is arranged to communicate with the clock system. In one embodiment, the data structure is a producer/consumer buffer which is arranged to reference the cyclics by effectively keeping track of pending cyclics.

In accordance with yet another aspect of the present invention, a computer-implemented method for responding to cyclic firing in a computing system with a system clock, a cyclic subsystem, and a central processing unit, includes comparing a current system time with an expiration time of a root cyclic. The current system time is obtained from the timestamp register, and the root cyclic is associated with a heap or a priority queue of the cyclic subsystem. The method also includes determining when the expiration time has passed, and reprogramming the interrupt source to fire at the expiration time when it is determined that the expiration time has not passed. In one embodiment, the method further requires obtaining a new expiration time when it is determined that the expiration time has passed, performing a downheap process on the heap to obtain a new root cyclic when it is determined that the expiration time has passed, and comparing a new current time with the new expiration time.

In accordance with still another aspect of the present invention, a computer-implemented method for enabling a device driver to communicate with a processor associated with a computing system includes exchanging information between a clock system and a cyclic system, as well as exchanging information between the cyclic system and the processor. The clock system does not directly exchange information with the processor. The method also includes implementing arbitrary resolution timeouts using the clock system and the cyclic system such that the arbitrary resolution timeouts are specifically implemented using a timestamp-compare register of the computing system. The arbitrary resolution timeouts are arranged to be used by the device driver.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which:

FIG. 3B is a diagrammatic representation of a heap, i.e., heap 310 of FIG. 3A, and a corresponding array in accordance with an embodiment of the present invention.

DETAILED DESCRIPTION OF THE EMBODIMENTS

Within a computing system, it is often desirable to allow clock timeouts or interrupts to be set to an arbitrary resolution. In some systems, a system clock may be tuned to enable arbitrary resolution timeouts to be implemented. Although tuning a system clock in a configurable system may enable different clock rates to be supported, in addition to not always being able to tune the system clock to a desired resolution, tuning often results in system performance penalties because of the increased interrupt load. Further, a high rate of computer interrupts may significantly increase interrupt latency and system jitter.

In order to reduce the performance penalties that are often associated with setting time-outs to arbitrary resolutions, rather than having a system clock communicate directly with a processor, a system clock is set to communicate indirectly with a processor. That is, a subsystem may serve as a "bridge" between a system clock and a processor in order to leverage per-processor absolute-expiration interrupt sources. The system clock, in one embodiment, may be considered to be an interval timer, e.g., a ten millisecond (ms) timer. Such a system clock may be implemented as a client of a lower-level subsystem which provides arbitrary resolution timers. Clients which require arbitary resolution interval timers may bypass the system clock and interact substantially directly with the new, lower-level subsystem.

The subsystem, e.g., a cyclic subsystem, is effectively a kernel subsystem that provides for arbitrary resolution and per-processor interval timeouts. In one embodiment, the cyclic subsystem is suitable for minimizing the amount of timeout jitter, and includes lock-free and high-locality data structures. The cyclic subsystem is further arranged to allow interval timers in a multi-processor system to be juggled from processor to processor as necessary.

Figure 1:
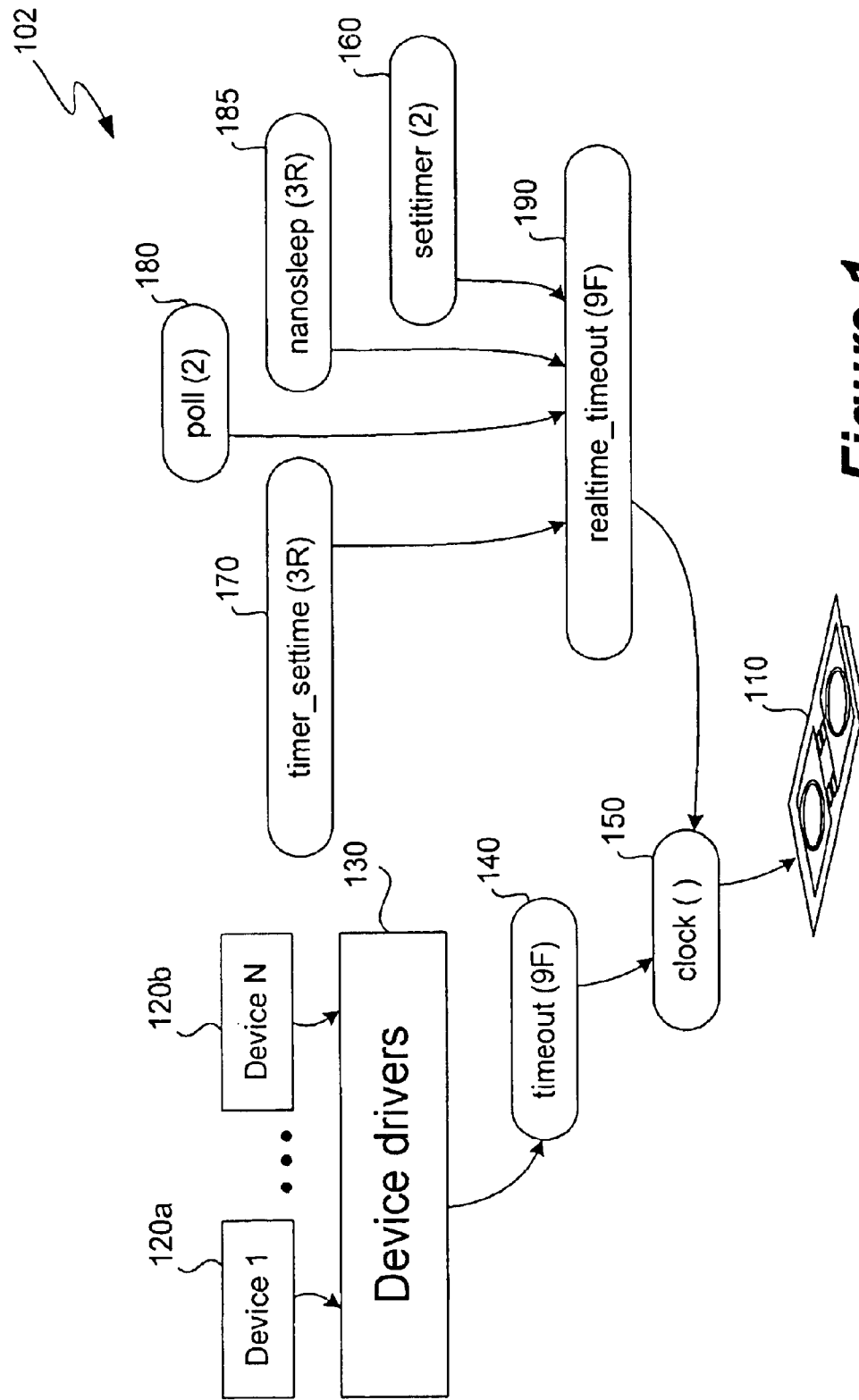
FIG. 1 is a diagrammatic representation of the interactions between device drivers and a central processing unit.
Figure 2:
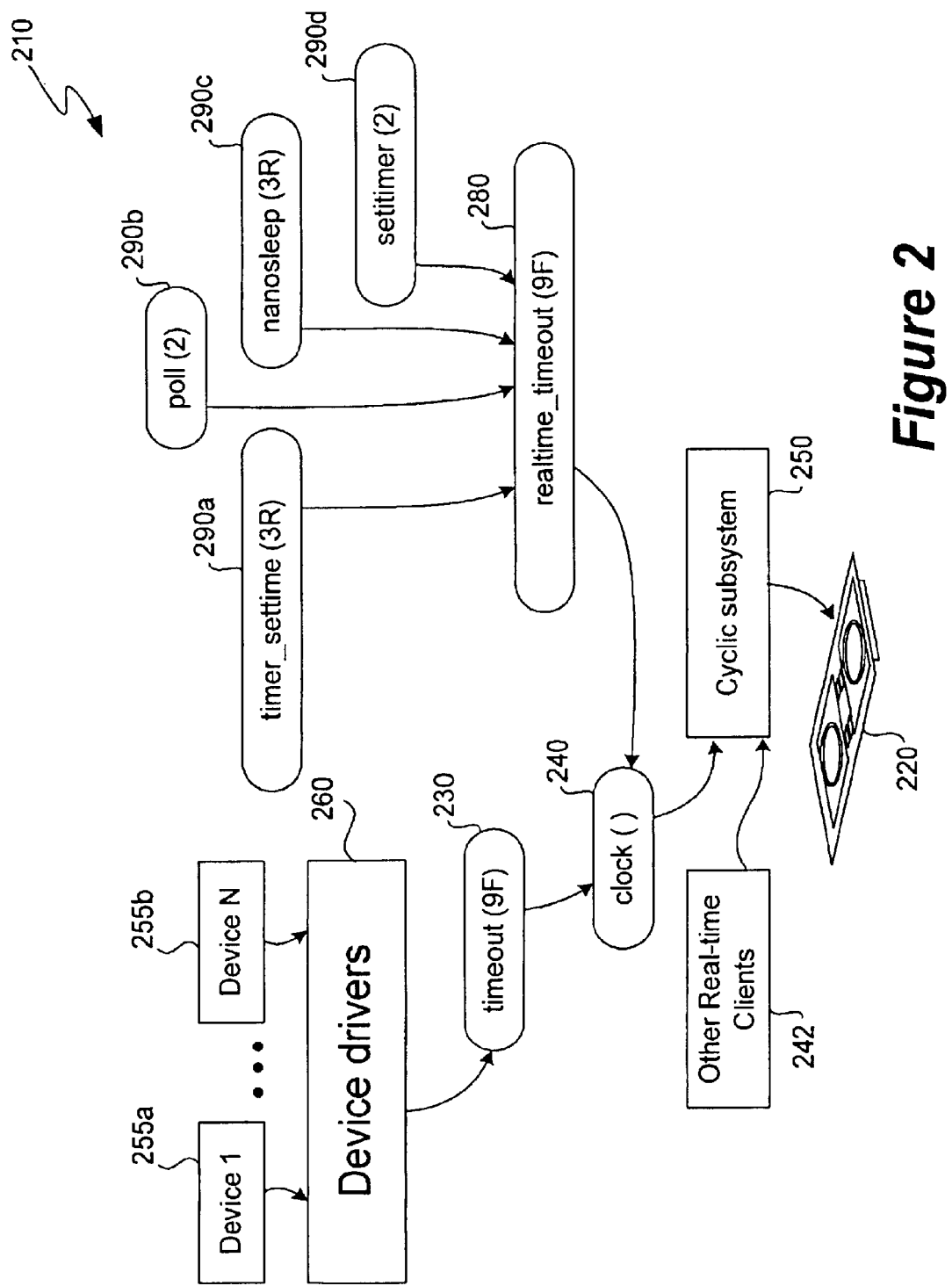
FIG. 2 is a diagrammatic representation of the interactions between device drivers and a central processing unit in accordance with an embodiment of the present invention.

FIG. 2 is a diagrammatic representation of the interactions between device drivers and a central processing unit (CPU) in accordance with an embodiment of the present invention. An overall computing system 210 includes a processing unit 220, and various devices and subsystems which communicate with processing unit 220. Device drivers 260, which are generally software associated with clients, devices, or cyclics 255, are arranged to enable cyclics 255 to be implemented within overall computing system 210. As will be understood by those skilled in the art, a cyclic 255 generally has a handler and a desired interrupt level, coupled with a nanosecond-resolution expiration and interval time. In general, cyclics 255 may include, but are not limited to, devices such as system peripherals.

Figure 3A:
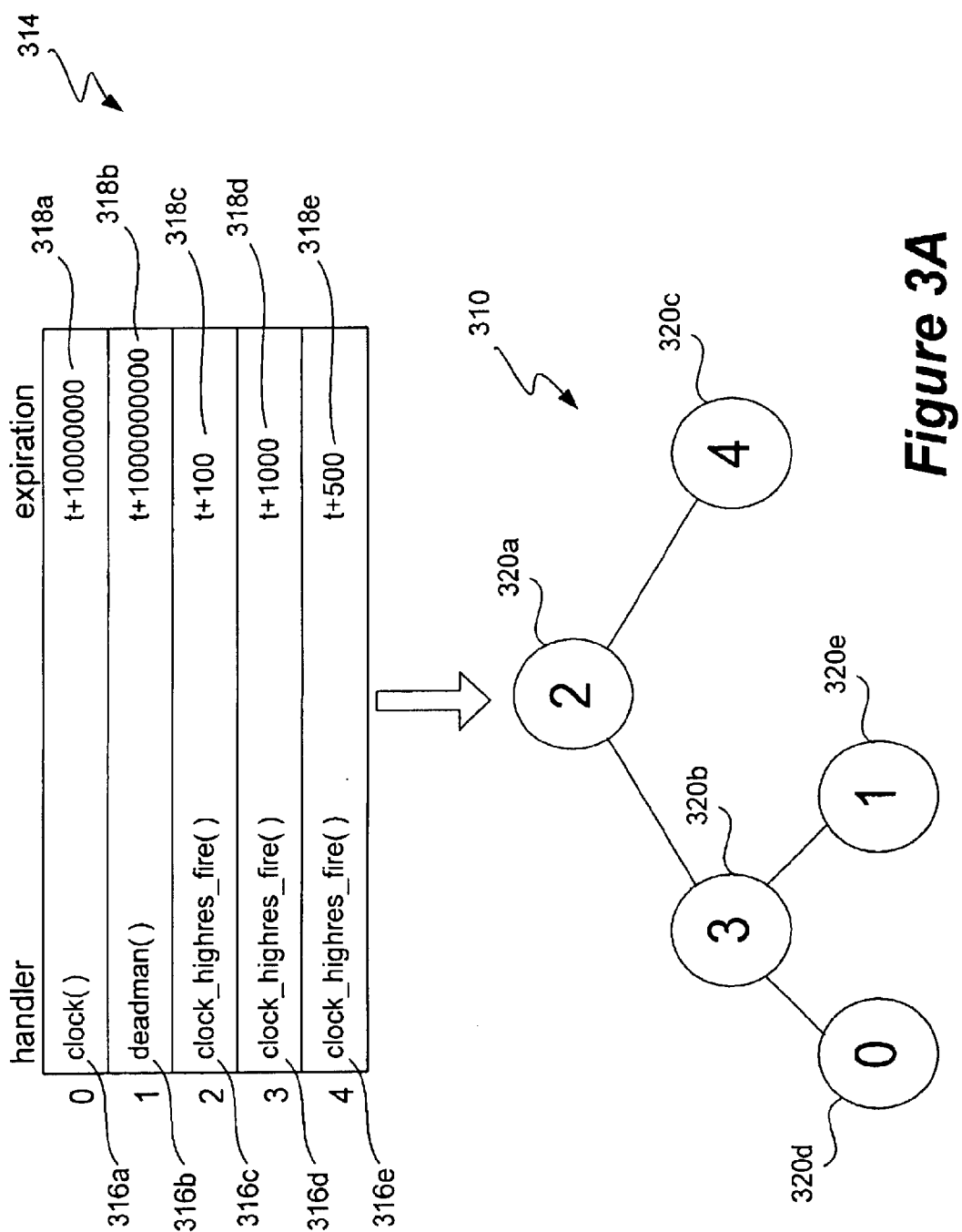
FIG. 3A is a diagrammatic representation of a heap in accordance with an embodiment of the present invention.
Figure 3C:
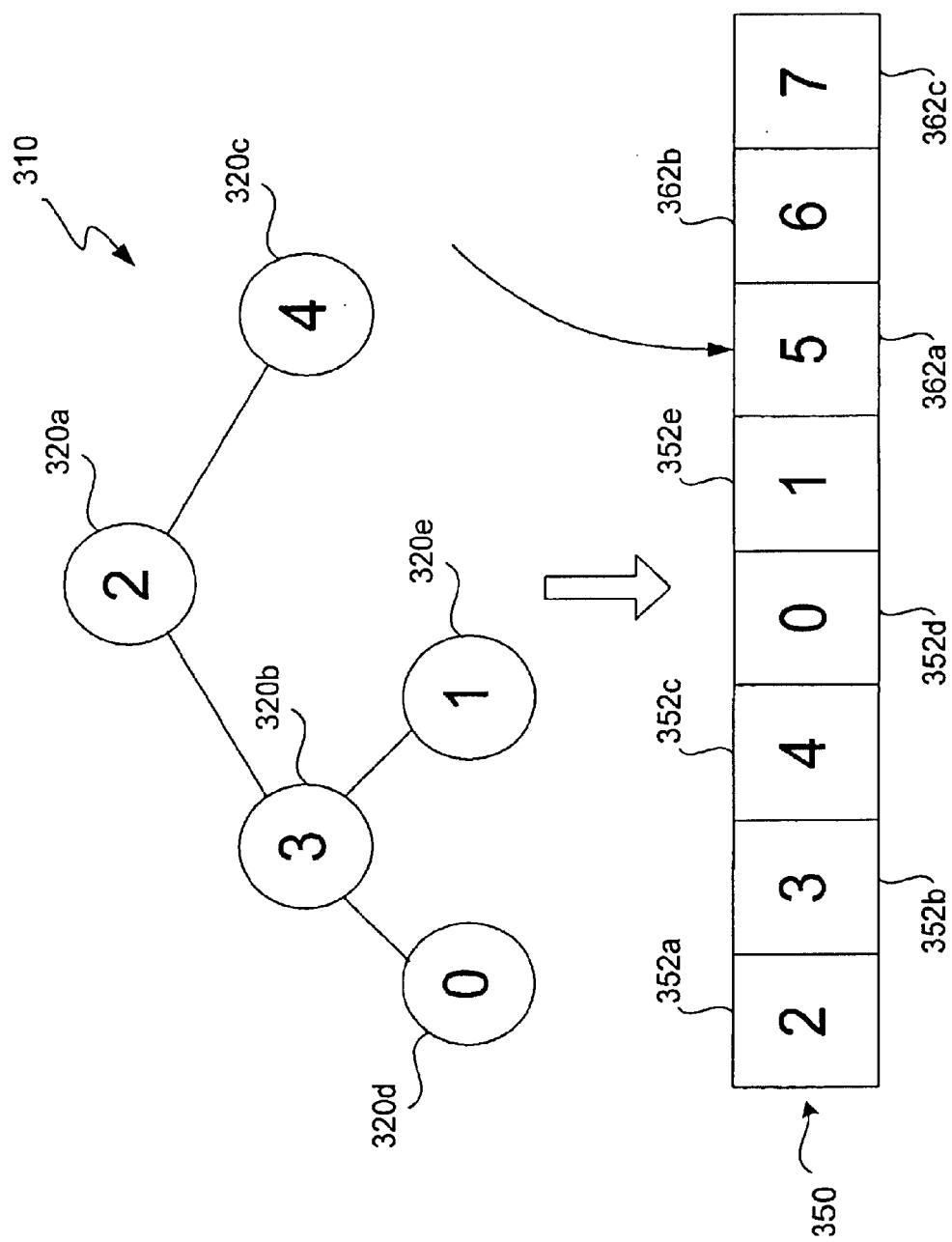
FIG. 3C is a diagrammatic representation of a heap, i.e., heap 310 of FIG. 3A and an array, i.e., array 350 of FIG. 3B, with a freelist in accordance with an embodiment of the present invention.

A cyclic 255, in one embodiment, may be considered to be a handler and a desired interrupt level, coupled with an interval time. A cyclic may also include information pertaining to an expiration time, e.g., a nanosecond-resolution expiration. Cyclic subsystem 250 is arranged to maintain a heap of cyclics 255, which are associated with device drivers 260. A heap of cyclics 255, which will be described below with reference to FIGS. 3A–3C, is effectively an implementation of a priority queue of cyclics 255 that may be used to access a cyclic 255 with the next expiration time.

A clock 240 is arranged to be called by a clock interrupt (not shown). Clock 240, which is typically a system clock, communicates with cyclic subsystem 250, and does not communicate directly with processing unit 220. In other words, clock 240 is a client of cyclic subsystem 250, which is in communication with, or "talks to," processing unit 220 or computing hardware in general. Other realtime clients 242 may also communicate substantially directly with cyclic subsystem 250, instead of directly with clock 240.

By implementing clock 240 as a client of cyclic subsystem 250, rather than enabling clock 240 to communicate substantially directly with processing unit 220, enables the resolution of timeouts to be arbitrarily set without inducing significant latency or jitter. The amount of latency or jitter that is induced may be substantially minimized by reducing the number of tasks which clock 240 is expected to perform. Implementing clock 240 as a client of cyclic subsystem 250 enables access to clock hardware and processor hardware. Further, the implementation of clock 240 as a client effectively enables legacy behavior to be maintained, while introducing new functionality, as will be discussed in more detail below.

A timeout interface 230 is arranged to enable callouts to be added into overall computing system 210, as will be understood by those skilled in the art. Timeout interface 230 is also used to obtain clock ticks from clock 240, e.g., obtain a number of clock ticks until a given expiration time. In the embodiment as shown, device drives 260 communicate with timeout interface 230 which, in turn, communicates with clock 240. Realtime timeout interface 280, like timeout interface 230, also obtains clock ticks from clock 240, and supports clients 290 which utilize interval-based timers.

As mentioned above, cyclic subsystem 250 is used to manage a heap of cyclics 255. FIG. 3A is a diagrammatic representation of a heap of cyclics in accordance with an embodiment of the present invention. A heap 310 is arranged to store the contents of a data structure 314, which lists handler elements 316, or cyclics, and associated expirations 318, e.g., expiration times. Heap 310 stores handler elements 316 such as handlers, as nodes 320 of a tree. Handler elements 316 are stored in nodes 320 such that handler elements 316 with the earliest expiration time 318 is effectively a parent node 320a.

In the embodiment as shown, parent node 320a is associated with handler element 316c, which has the earliest expiration time 318c of all handler elements 316 in data structure 314. As shown, handler element 316c is set to expire approximately 100 nanoseconds from the current time "t." Children nodes 320b, 320c of parent node 320a are associated with handler element 316d and handler element 316e, respectively. Nodes 320d, 320e are effectively children nodes with respect to node 320b, and correspond to handler element 316a and handler element 316b, respectively. It should be understood that children nodes, e.g., nodes 320d, 320e, have later expiration times than corresponding parent nodes, e.g., node 320b.

In heap 310, nodes 320 are added in a top-down, left-to-right manner. For example, node 320a would be the first node added to heap 310, followed by node 320b, node 320c, node 320d, and node 320e. When an additional node is subsequently added to heap 310, that node would be added as a child node of node 320c, in the described embodiment. In general, however, nodes may be added in substantially any suitable order. When a new cyclic is added into a system, an upheaping operation may be performed to keep the heap ordered when nodes are not added in a top-down, left-to-right manner.

For efficiency, heap 310 may be implemented as an array, although it should be understood that heap 310 may generally be implemented in a variety of different ways. Implementing a heap as an array, as opposed to implementing a standard pointer-based heap, increases the efficiency associated with a system which provides for arbitrary resolution timeouts. In one embodiment, each node or element of heap 310 includes an index into a per CPU array of cyclics, or clients.

With reference to FIG. 3B, the representation of heap 310 as an array will be discussed in accordance with an embodiment of the present invention. An array 350 includes elements 352 which are associated with nodes 320 of heap 310. Root node 320a is effectively stored as the zeroth element 352a of array 350. Children nodes 320b, 320c, which are considered to be in the same layer, are stored as the first element 352b and the second elements 352c, respectively, of array 350. Specifically, children nodes 320b, 320c are stored in array 350 from "left to right," i.e., child node 320b is stored into array 350 in position 352b and child node 320c is stored into array 350 in position 352c. Finally, the children nodes 320d, 320e that are associated with child node 320b are stored as the fourth element 352d and the fifth element 352e of array 350.

As all nodes 320 in a layer are essentially stored together in array 350, if child node 320c were to have at least one child node, that child node would be stored into array 350 after element 352e. In general, the first layer of heap 310 occupies one element 352a in array 350, while the second layer of heap 310, e.g., the layer made up of nodes 320b, 320c occupies up to two elements of array 350. In the embodiment as shown, the third layer of heap 310, e.g., the layer made up of nodes 320d, 320e occupies two elements 352d, 352e of array 350. In alternate embodiments, the third layer of heap 310 may occupy up to four elements 352 of array 350, as for example if node 320c had two children nodes. When heap 310 includes a fourth layer, which may be the case if node 320c had two children nodes and additional nodes were needed by heap 310, then the fourth layer would occupy up to eight elements 352 of array 350, positioned after elements 352 occupied by nodes 320 associated with the third layer.

In general, as discussed above, heap 310 is laid out by layer such that substantially all nodes 320 at a given depth, or in a given layer, are stored as consecutive elements 352 in array 350. By storing nodes 320 as consecutive elements 352, a high locality of reference is typically possible during a downheaping operation to a depth specified as the "base 2" logarithm of the cache line size, e.g., the size of an array, over the size of an element 352. Downheap may be accomplished up to this depth with very few cache misses, e.g., at most one cache miss may occur up to this depth in the described embodiment. At depths beyond the specified depth, at most one cache miss will typically occur at each level. A downheaping, or a rearranging of a heap such that the next cyclic to expire is at the root of the heap, is generally included as a part of a cyclic firing process, as will be described below with reference to FIG. 4.

Reducing the number of cache misses which may potentially occur during downheaping generally serves to increase the efficiency with which a computing system may operate. By way of example, high miss penalties may be incurred when a cache miss occurs. By minimizing the number of cache misses which may occur, the penalties incurred may also be minimized.

Heaps are typically full, balanced trees. In order to maintain the balance associated with a heap, heap management facilities are arranged to track the next insertion point associated with a heap. That is, heap management facilitates the location of insertion for the next, potential node with respect to the heap. In standard pointer-based heaps, a recomputation of the next insertion point may require significant computational overhead. Using an array, e.g., array 350 of FIG. 3B, and, hence, an array-based heap, enables the next insertion point to be readily identified. In the described embodiment, the next insertion point may be a specific element, such as the last element, of the array.

A freelist, as will be appreciated by those skilled in the art, is a list of cyclics which are not yet allocated. As shown in FIG. 3C, a freelist 362 is stored in array 350 beginning at the next insertion point. Storing a freelist in such a manner enables allocation from the freelist to be readily made as the number of allocated cyclics is substantially incremental. A freelist head 362a is stored as the first element in array 350 which does not correspond to a node of heap 310.

Figure 4:
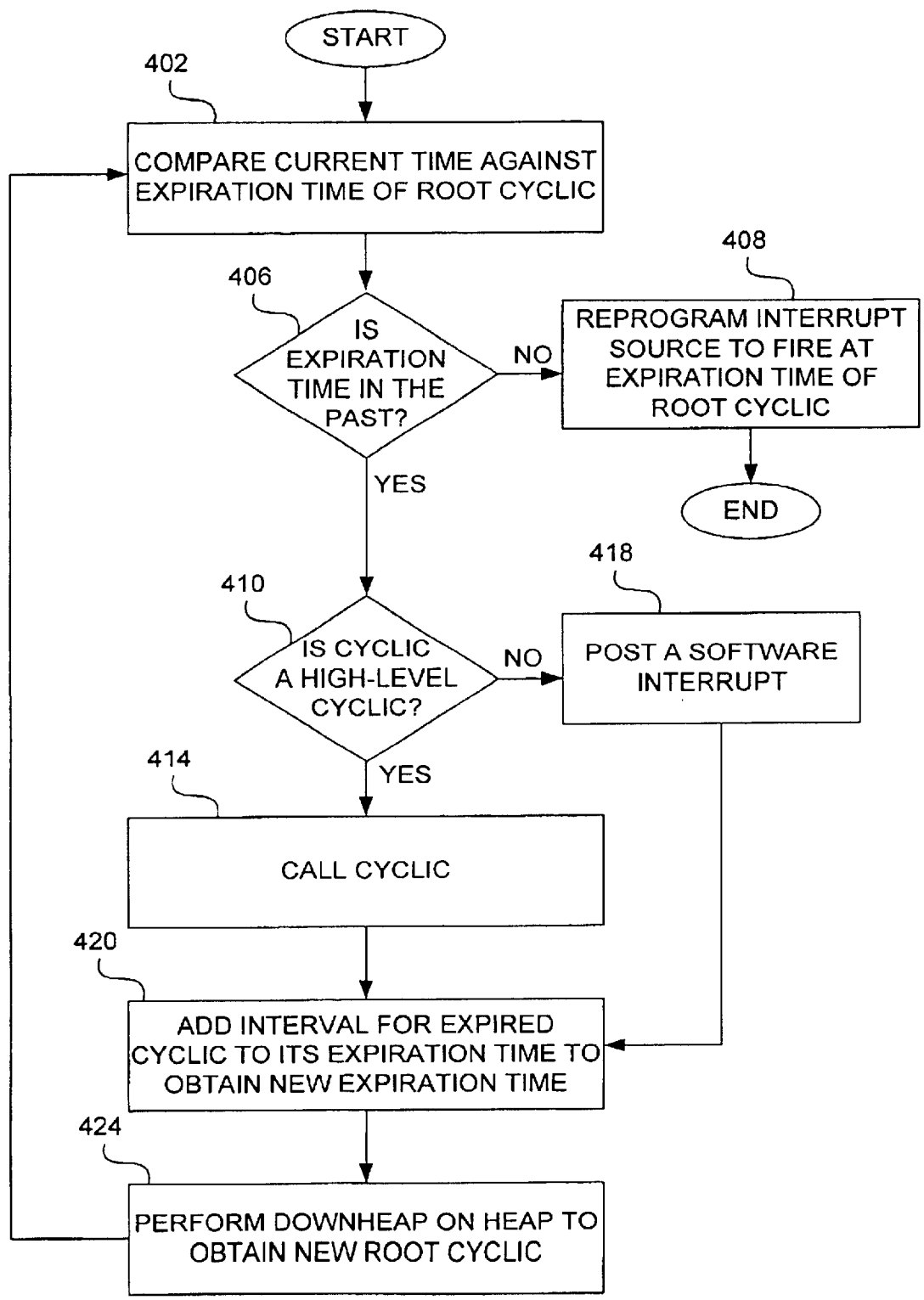
FIG. 4 is a process flow diagram which illustrates a method of responding to cyclic firing in accordance with an embodiment of the present invention.

The expiration times associated with heap 310 are studied to determine when an expiration time is in the past whenever an interrupt source fires, i.e., whenever cyclic firing occurs. With reference to FIG. 4, a method of responding to cyclic firing will be described in accordance with an embodiment of the present invention. The process begins at step 402 in which the current time "t" is compared against the expiration time of the root cyclic, i.e., root node 320a as shown in FIGS. 3A–C, in step 402. After the comparison of the current time "t" against the expiration time, a determination is made in step 406 as to whether the expiration time of the root cyclic is in the past, or has expired.

If it is determined in step 406 that the expiration time is in the past, then process flow proceeds to step 410 where a determination is made as to whether the cyclic is a high-level cyclic. A high-level cyclic is a cyclic which is associated with a device that interrupts at a high-level, e.g., at levels ten through fifteen of a system with fifteen interrupt levels. If it is determined that the cyclic is a high-level cyclic, then the cyclic is called in step 414. Alternatively, when it is determined in step 410 that the cyclic is not a high-level cyclic, then process flow moves to step 418 where a software interrupt is posted.

From steps 414 and 418, process flow proceeds to step 420 where a new expiration time for the expired root cyclic is calculated. By way of example, calculating a new expiration time may include adding the interval associated with the expired cyclic to its expiration time in order to obtain the new expiration time. Once the new expiration time is determined, a downheap operation is performed on the heap to obtain a new root cyclic in step 424. Performing a downheap enables the cyclic which is next to expire to be identified. In general, a downheaping process reorders the nodes of a heap such that the heap accurately reflects an order in which cyclics are currently set to expire. As will be appreciated by those skilled in the art, a downheap may be performed in time on the order of a base2 logarithm "N" time, i.e., $O(\lg(N))$ time. After a downheap is performed to identify a new root cyclic in step 424, process flow returns to step 402 in which the current time is compared against the expiration time of the new root cyclic.

Referring back to step 406, if it is determined that the expiration time of the root cyclic is not in the past, then the indication is that the root cyclic is the next cyclic that is set to expire. Accordingly, process flow moves to step 408 where the interrupt source is reprogrammed or otherwise set to fire at the expiration time of the root cyclic. Once the interrupt source is reprogrammed or otherwise set, the process of responding to the firing of an interrupt source is completed.

In a system which enables arbitrary resolution interval timeouts, interrupt levels, or different levels of importance for interrupts from hardware, exits. For example, in a Solaris™ system developed by Sun Microsystems, Inc. of Palo Alto, Calif., up to fifteen interrupt levels may be in existence. In general, thread dispatching of threads in an operating system occurs at what is known as "lock level." When a CPU is operating at lock level, no piece of hardware with an interrupt level below lock level may fire an interrupt. Typically, most devices interrupt below lock level.

Any context that is running at an interrupt level greater than lock level is considered to be at a high level. At a high level, a thread may not block but, instead, spins until it may proceed, as will be understood by those skilled in the art. Devices which interrupt at a high level typically post a software interrupt, i.e., an interrupt induced by software rather than hardware, if the devices require interaction with a kernel. Required interactions may include, but are not limited to, the allocation of memory.

A system clock, e.g., clock 240 of FIG. 2, is often arranged to run at lock level. In a Solaris™ environment, for example, a system clock may have a level-10 source, as compared with a deadman operation which may have a level-14 source. A deadman operation, which is implemented by a kernel, is arranged to shut down a system that is not progressing. Thus, on some machines that include a timestamp-compare register, e.g., machines developed by Sun Microsystems, Inc., the timestamp-compare register may generate a level-14 interrupt. It should be understood that the discussion in the context of the Solaris™ environment is merely exemplary, and the invention is applicable to various other environments.

In one embodiment, a cyclic subsystem allows cyclics to execute at substantially any level. That is, a cyclic may be executed at either a high level, a low level, or lock level. Heap processing, or cyclic expiry processing, occurs at a high level and effectively does not block. It should be appreciated that there is a one-to-one mapping between the expiration of a cyclic at a high level, and the execution of the cyclic at its desired level.

Maintaining a one-to-one mapping between the expiration of a cyclic at a high level and the execution of the cyclic at its desired level depends upon the desired level of the cyclic. That is, for substantially every cyclic expiration, there is one cyclic execution. For example, for a high level cyclic, the cyclic is executed as it is expired. As such, a one-to-one mapping is effectively trivial to maintain. Alternatively, for either a lock level cyclic or a low level cyclic, a disconnect may occur. Specifically, if a CPU is at an interrupt level that is less than a high level but greater than the desired level for a period of time of greater than approximately twice the interval associated with the cyclic, the cyclic may expire approximately twice before the cyclic may be executed.

In order to maintain a one-to-one mapping at a lock level or a low level, the difference between the number of times a cyclic has been expired and the number of times the cyclic has been executed is tracked. In the described embodiment, the difference may be tracked using a per-cyclic pending count variable. For cyclic software interrupt processing that is running at either a lock level or a low level, the handler associated with the cyclic may be repeatedly executed and decremented until its pending count is zero.

Cyclic expiry processing is arranged to enqueue a cyclic by storing an index of the cyclic into a producer/consumer buffer, and incrementing a related producer index variable, e.g., a prodndx variable. A producer/consumer buffer is a buffer or set of buffers into which expiry processing produces and from which software processing consumes. Cyclic software interrupt processing is arranged to dequeue a cyclic by loading the contents from the producer/consumer buffer, and to increment a related consumer index variable, e.g., a consndx variable. The producer/consumer buffer is considered to be empty when the producer index variable is substantially equal to the consumer index variable. As will be understood by one of skill in the art, software interrupt processing occurs at a low-level or at a lock-level, while expiry processing occurs at a high-level.

Figure 5:
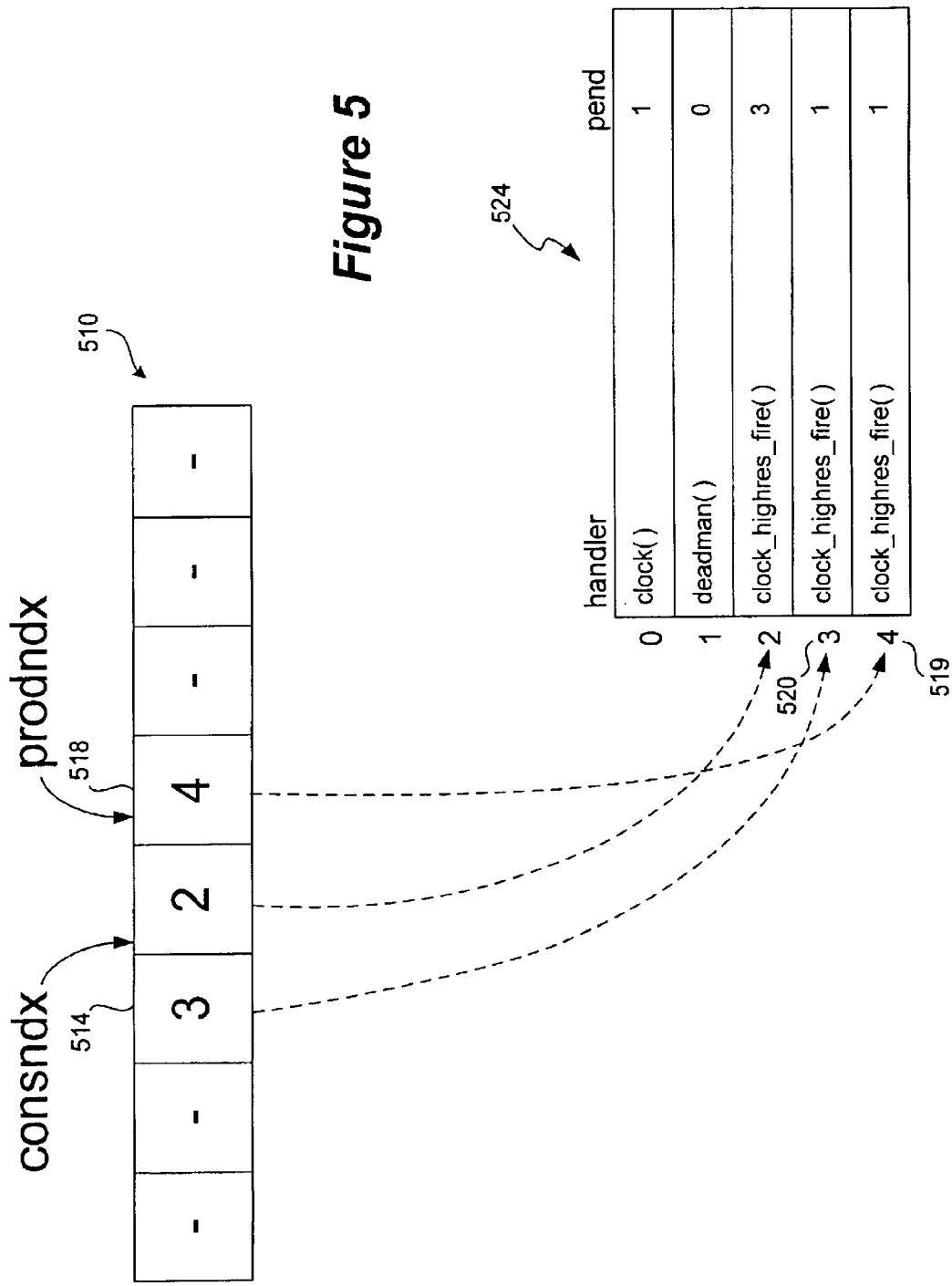
FIG. 5 is a diagrammatic representation of a producer/consumer buffer in accordance with an embodiment of the present invention.

FIG. 5 is a diagrammatic representation of a producer/consumer buffer in accordance with an embodiment of the present invention. A producer/consumer buffer 510, which may be implemented as an array, is generally shared across multiple interrupt levels. In some systems, one or more producer/consumer buffers such as buffer 510 may be shared by all interrupt levels. A consumer index variable is generally incremented each time a cyclic is dequeued. That is, a consumer index variable is incremented to indicate that a cyclic with a pending count that has been decremented to a specific value, e.g., zero, has been dequeued. A cyclic is dequeued by loading an appropriate value from producer/consumer buffer 510. For instance, the appropriate value may be stored in a location 514 within producer/consumer buffer 510 that is identified using the consumer index as an index into producer/consumer buffer. It should be understood that the appropriate value is generally an index into a data structure, e.g., an index 519 into a data structure 524, that stores cyclics associated with a heap.

Similarly, a producer index variable is typically incremented to indicate that a cyclic has been enqueued. When a cyclic is enqueued, an index associated with a cyclic, e.g., an index 520 into data structure 524 which effectively lists cyclics associated with a heap, is stored in a location 518 within producer/consumer buffer 510. It should be understood that a cyclic is typically enqueued only if the pending count of the cyclic is zero.

Producer/consumer buffer 510 is considered to be empty when the producer index variable is equal to the consumer index variable. In other words, when the consumer index and the producer index are equal, the indication is that there are no pending cyclics.

As stated above, cyclics are generally enqueued in producer/consumer buffer 510 only when their pending counts are zero, and cyclics are generally dequeued from producer/consumer buffer 510 only when their pending counts have been decremented to zero. By allowing enqueuing and dequeuing to occur substantially only under such conditions, the size of producer/consumer buffer 510 may be bounded. In some situations, as for example when a new cyclic is created and producer/consumer buffer 510 is at capacity, it may be desirable to alter, e.g., increase, the size of producer/consumer buffer 510. A method of resizing producer/consumer buffer 510 will be discussed below with reference to FIGS. 8A and 8B.

Access to per-CPU data structures that are shared between interrupt levels, e.g., shared producer/consumer buffers, may be serialized by manipulating programmable interrupt levels, as will be appreciated by those skilled in the art. Readers of and writers to the data structures generally raise their interrupt level to the level of the highest writer. However, in the case of cyclic software interrupt processing, raising interrupt levels for lock level and low level processing may induce latency and jitter in high level cyclic expiration.

Figure 6:
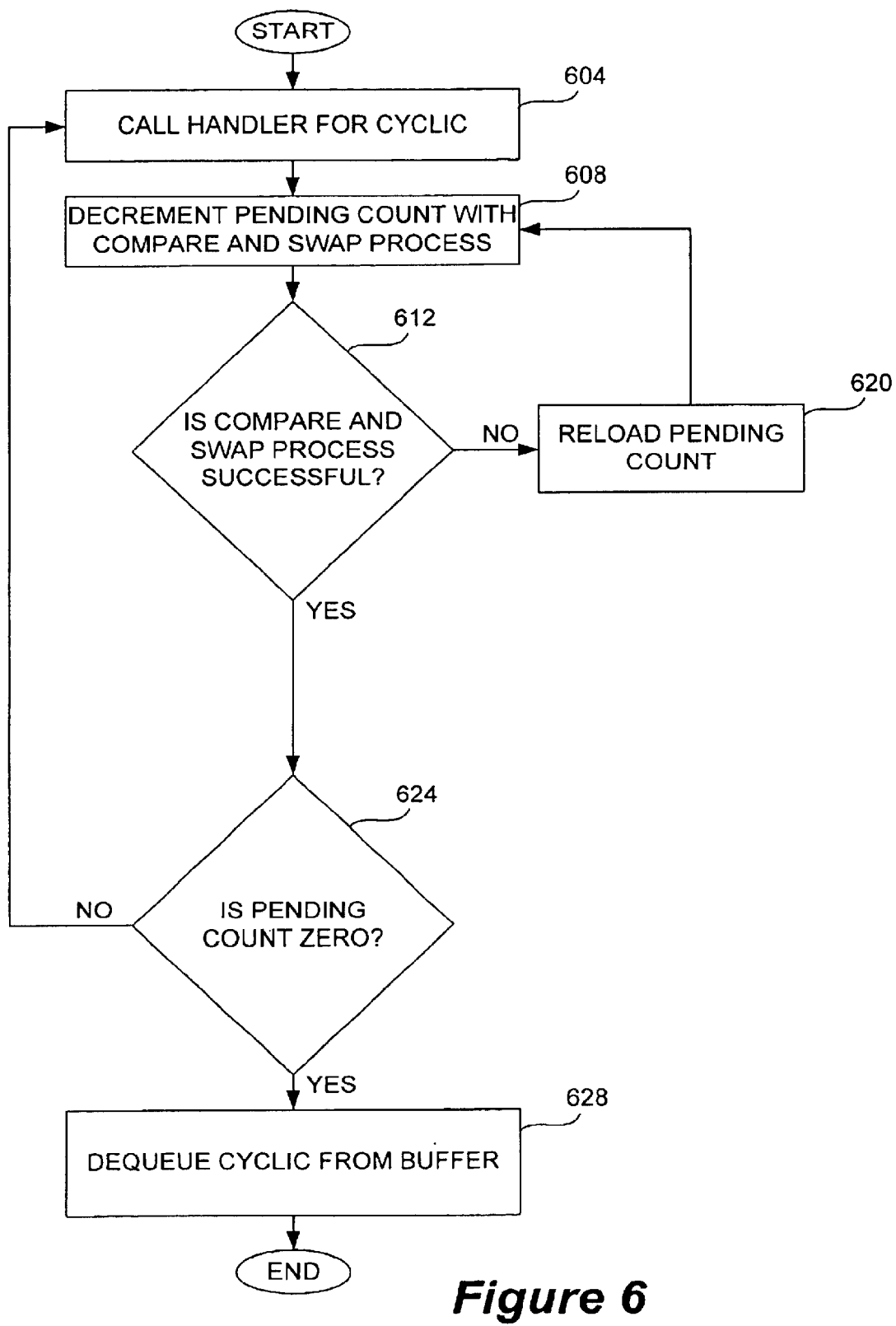
FIG. 6 is a process flow diagram which illustrates the steps associated with a method for performing a software interrupt in a lock-free manner in accordance with an embodiment of the present invention.

To minimize latency and jitter, expiry processing at a high level and software interrupt processing may be implemented without locks. Since expiry processing typically occurs at a high level, substantially all actions on the producer/consumer buffer may appear to be atomic to lower interrupt levels, thereby enabling expiry processing to be implemented in a lock-free manner. By way of example, a high level software interrupt may interrupt between two instructions, i.e., two instructions associated with a lower interrupt level. FIG. 6 is a process flow diagram which illustrates the steps associated with a method for performing a software interrupt in a lock-free manner in response to the discovery of a cyclic in accordance with an embodiment of the present invention. The performance of a lock-free software interrupt begins at step 604 in which a handler for a cyclic is called. In other words, once a cyclic is discovered in a producer/consumer buffer, its handler is called.

After the handler for the cyclic is called, then a compare and swap process is performed in step 608. In the described embodiment, the compare and swap process is arranged to decrement, e.g., atomically decrement, the pending count of a cyclic, as was discussed above. Once the compare and swap command is performed, a determination is made in step 612 as to whether the compare and swap process was successful. If it is determined that the compare and swap operation was not successful, then the indication is that the value of the pending count was not an expected value, and that an interrupt has occurred. When the compare and swap process fails, in one embodiment, the implication is that cyclic expiry processing has intervened, and that the pending count has been increased as a result of the cyclic expiry processing. Accordingly, process flow moves to step 620 where the pending count is reloaded. After the pending count is reloaded, process flow returns to step 608 where another compare and swap operation is performed.

Alternatively, if the determination in step 612 is that the compare and swap process was successful, then the implication is that the pending count has been successfully decremented. In one embodiment, the successful decrementing of the pending count indicates that a swap has been made, i.e., the indication is that the assumed address value compared as expected with the address value as desired. When the compare and swap process was successful, then process flow proceeds to step tep 624 in which a determination is made regarding whether the pending count is zero. When it is determined that the pending count is zero, i.e., when the pending count was decremented to zero, the indication is that the cyclic has been consumed. Accordingly, the cyclic is dequeued from the producer/consumer buffer in step 628. Although substantially any method may be used to dequeue a cyclic from the producer/consumer buffer, one suitable method involves loading appropriate values from the producer/consumer buffer and incrementing a consumer index variable. Upon dequeuing the cyclic, the process of performing a lock-free software interrupt is completed.

As described above with reference to FIG. 5, the size of a producer/consumer buffer is typically bounded by having expiry processing enqueue substantially only those cyclics with a pending count of zero. In cyclic software interrupt processing, once the pending count associated with a cyclic has been decremented to zero, the cyclic is not reexamined. Hence, the handler for the cyclic is called before the pending count is decremented, and the cyclic with a pending count that has been decremented to zero is dequeued from the producer/consumer buffer to prevent the cyclic from being reexamined.

Returning to step 624, when the determination is that the pending count is not zero, then the cyclic has not been consumed. In the described embodiment, when the cyclic has not been consumed, process flow returns to step 604 in which the handler for the cyclic is called.

Lock-free software interrupt processing, as discussed with reference to FIG. 6, may be complicated when it becomes necessary to either remove a cyclic, resize a cyclic array, or add a cyclic. It may be necessary to remove a cyclic when a device is being removed from the overall computing system. In general, removing cyclics is rare, and a system clock cyclic is substantially never removed. However, when a cyclic is removed, or a resizing or addition of a cyclic is needed, such actions may be serialized on a single lock. The removal of a cyclic will be described below with respect to FIG. 7.

The resizing, e.g., increasing in size, of either a cyclic array or a heap array generally occurs atomically. Typically, increasing the size of an array involves doubling the size of the current array. In order to resize a cyclic array or a heap array, the interrupt level may be raised to a high-level such that the resizing process is effectively not interrupted. Once the interrupt level is raised, the contents of the cyclic array that is to be resized or the heap array that is to be resized are copied into new larger arrays, and associated pointers are updated to reference the new arrays. As will be appreciated by those skilled in the art, due to issues of dynamic memory allocation, additional contiguous space typically may not be allocated for the "old" cyclic and heap arrays. Hence, new arrays, with contiguous memory space, are allocated when extra space is needed by either a cyclic array or a heap array.

Figure 7:
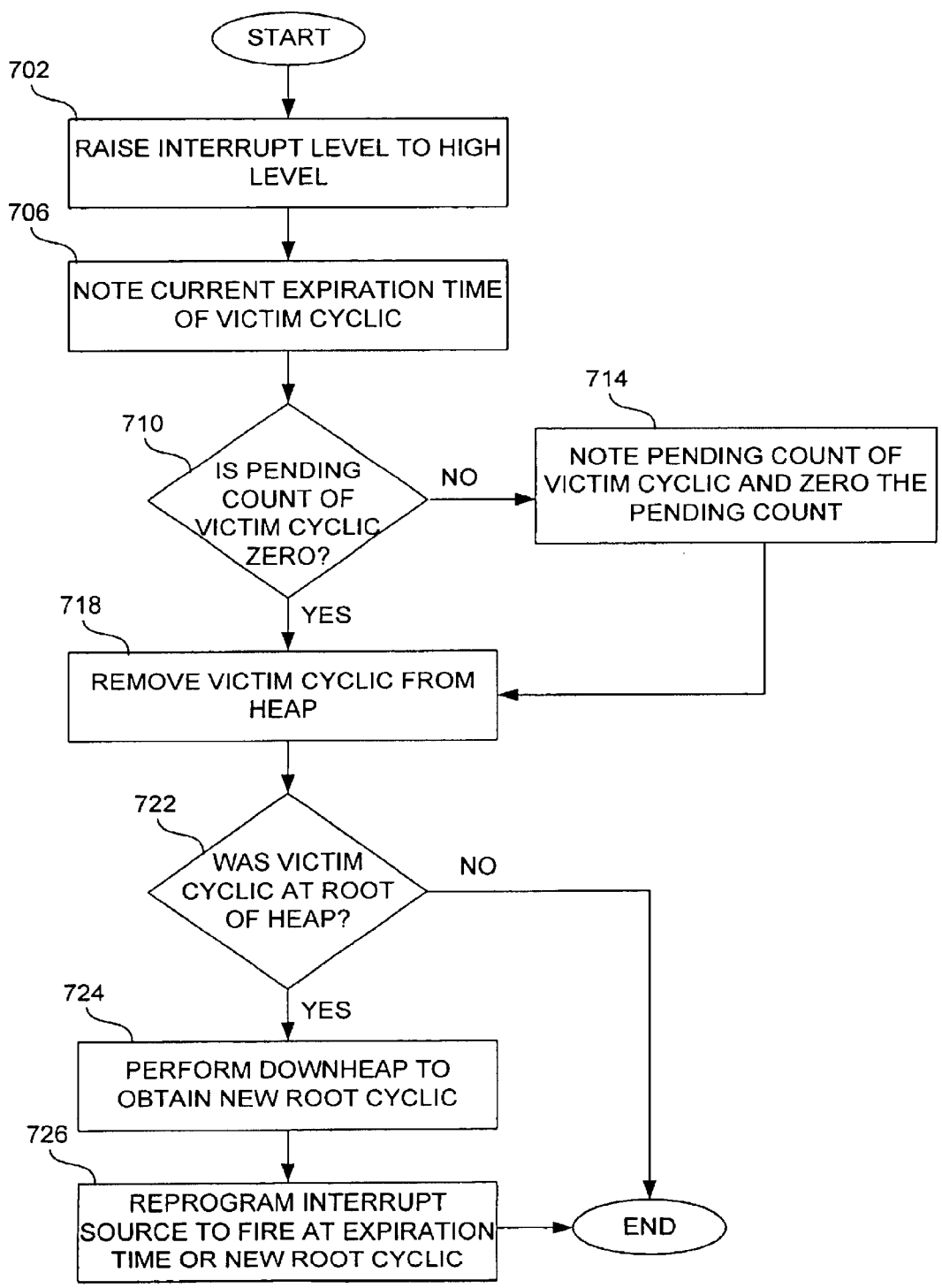
FIG. 7 is a process flow diagram which illustrates the steps associated with removing a cyclic from a system in accordance with an embodiment of the present invention.

FIG. 7 is a process flow diagram which illustrates the steps associated with removing a cyclic from a system in accordance with an embodiment of the present invention. The process removing a cyclic from an overall computing system begins at step 702 where the interrupt level is raised to a high level, e.g., the highest level, in order to prevent higher level interrupts from interrupting during the removal process. In other words, expiry processing is effectively blocked. Once the interrupt level is raised, the current expiration time of the victim cyclic, i.e., the cyclic that is to be removed, is noted in step 706. Noting the current expiration time may include, but is not limited to, storing the current expiration time in a data structure associated with a producer/consumer buffer, or as a temporary variable.

After the current expiration time of the victim cyclic is noted in step 706, a determination is made in step 710 as to whether the pending count of the victim cyclic is zero. If it is determined that the pending count of the victim cyclic is not zero, then the pending count is noted and subsequently zeroed, after it is noted, in step 714. Process flow then proceeds to step 718 where the victim cyclic is removed from the heap on which the victim cyclic was located. If the determination in step 710 was, instead, that the pending count of the victim cyclic is zero, then process flow proceeds directly from step 710 to step 718.

Once the victim cyclic is removed in step 718, a determination is made in step 722 as to whether the victim cyclic was at the root of a heap. In other words, it is determined in step 722 whether the victim cyclic was associated with a root node of a heap as previously described with respect to FIGS. 3A–3C. When it is determined that the victim cyclic was not at the root of the heap, then the process of removing a cyclic from a computing system is completed. Alternatively, if it is determined that the victim cyclic was at the root of a heap, then a downheap is performed in step 724 to obtain a new root cyclic. After the new root cyclic is obtained, then the interrupt source is reprogrammed in step 726 to fire at the expiration time of the new root cyclic, and the process of removing a cyclic from a computing system is completed.

In some situations, a cyclic removal operation may interrupt the processing of a software interrupt during a compare and swap operation. In the described embodiment, if the pending count of the victim cyclic was noted as being non-zero in step 714, then a cyclic removal operation interrupted the software interrupt processing. When a compare and swap operation fails, the relevant pending count, i.e., the pending count of a cyclic that is the subject of a compare and swap operation, is checked. It should be understood that if the pending count is zero, and a remove operation is in progress, then the non-zero pending count was noted during the removal process, i.e., the pending count stored in step 714 of FIG. 7. The stored pending count may be used to call the victim cyclic handler the appropriate number of times before the victim cyclic is removed.

When it is determined that a removal procedure has been in progress with respect to a potential victim cyclic during a compare and swap operation, the remove operation may block until the software interrupt processing for the potential victim cyclic has been completed. Once the software interrupt processing is completed for the potential victim cyclic, then the resources associated with the victim cyclic may be safely freed for reallocation.

As discussed above with reference to FIG. 5, it may be necessary to resize a producer/consumer buffer. In one embodiment, each software interrupt level has up to two producer/consumer buffers, e.g., a "hard" buffer into which expiry processing produces and a "soft" buffer from which software interrupt processing consumes. The hard buffer and the soft buffer, under standard conditions, may point to a single underlying buffer, while cyclic software interrupt processing consumes cyclics from the soft buffer.

Figure 8A:
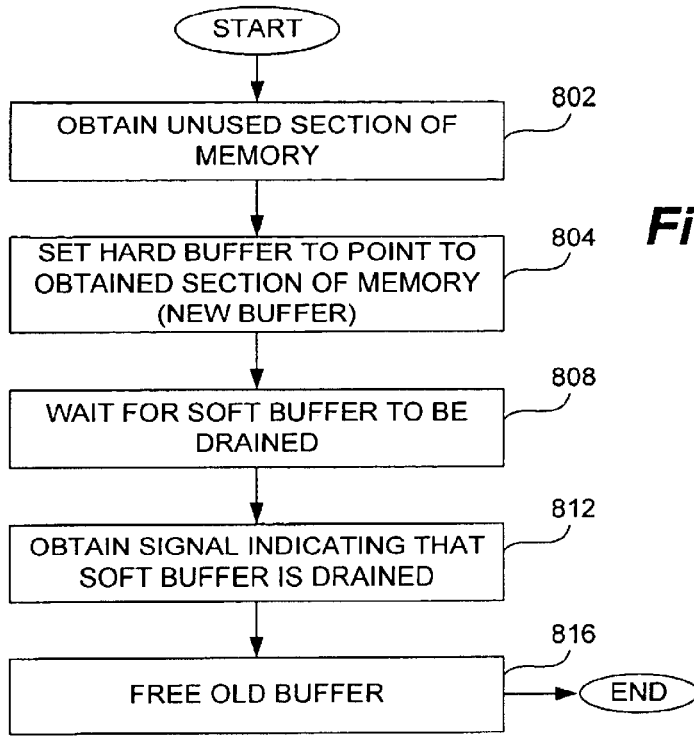
FIG. 8A is a process flow diagram which illustrates the steps associated with resizing producer/consumer buffers using a thread in accordance with an embodiment of the present invention.

FIG. 8A is a process flow diagram which illustrates the steps associated with resizing producer/consumer buffers in accordance with an embodiment of the present invention. When it is determined that a producer/consumer buffer requires additional memory, as for example when an underlying buffer no longer contains sufficient free space, a resizing operation is called. A resizing operation begins at step 802 in which an attempt is made, e.g., by a thread, to obtain an unused section of memory. In the described embodiment, the unused section of memory is larger, e.g., twice as large, as the existing underlying buffer that is referenced by a hard buffer and a soft buffer.

After a new section of memory is successfully obtained, then in step 804, the hard buffer is set to point to the new section of memory, e.g., the new buffer. It should be appreciated that a new section of memory is substantially always successfully obtained. When the hard buffer is set to point to the new buffer, any future expiry processing will typically produce cyclics into the new buffer. Once the hard buffer is set to point to the new buffer, process flow moves to step 808 in which the resize operation waits for the soft buffer to be drained. That is, the resize operation waits for any pending cyclics in the soft buffer to be consumed.

When the soft buffer is drained, a signal is obtained that indicates that the soft buffer is drained in step 812. The signal is generally sent in the course of processing a software interrupt, as will be discussed below with reference to FIG. 8B. Once the signal is obtained, the old buffer is freed in step 816. In other words, the memory space associated with the old buffer which was effectively replaced by the new buffer is released such that the memory space may be allocated for other purposes. Once the old buffer is freed, the process of resizing a producer/consumer buffer is completed.

Figure 8B:
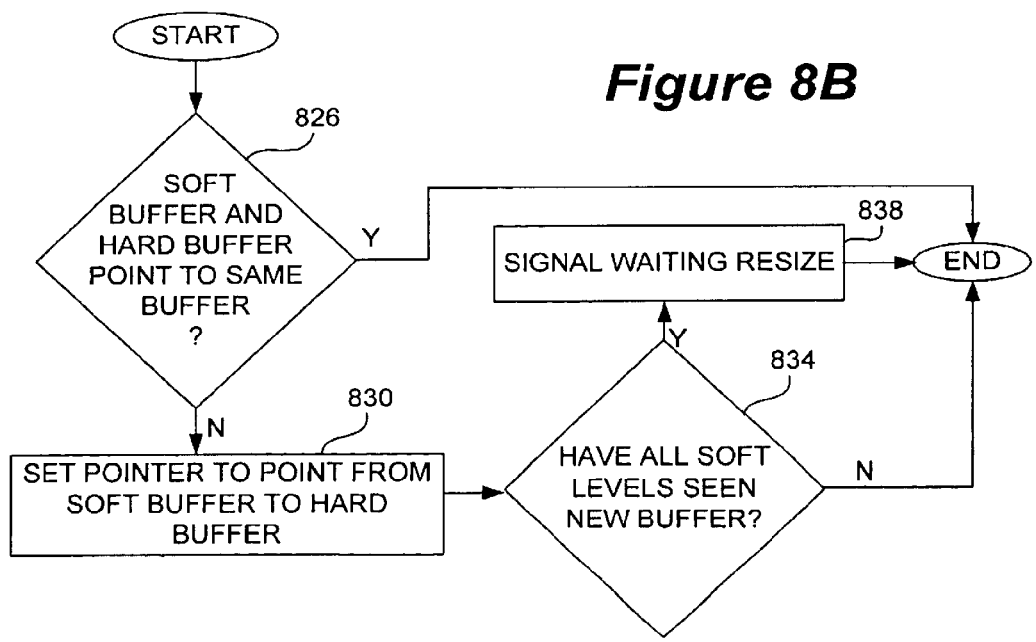
FIG. 8B is a process flow diagram which illustrates how software interrupt processing affects the resizing of a producer/consumer buffer in accordance with an embodiment of the present invention.

In one embodiment, after a software interrupt is performed, as described above with respect to FIG. 6, a software handler drains a soft buffer and, hence, enables an old buffer to be freed during a buffer resizing process. With reference to FIG. 8B, the "post-processing" of a software interrupt will be described in accordance with an embodiment of the present invention. Once a software interrupt is completed, post-processing processing begins at step 826 in which a determination is made regarding whether the soft buffer and the hard buffer reference the same underlying buffer. Such a determination is generally made through an examination of the hard buffer by a software interrupt handler. When it is determined that the soft buffer and the hard buffer point to different buffers, then the post processing procedure is completed.

Alternatively, if the soft buffer and the hard buffer point to different buffers, process flow moves from step 826 to step 830 where a pointer is set to point from the soft buffer to the hard buffer. In other words, the pointer from the soft buffer to an underlying buffer is changed to point to the hard buffer. It should be appreciated that at this point, if the soft buffer contains pending cyclics, i.e., if a cyclic fired between the time the soft buffer was drained and the pointer was changed, the pending cyclics are consumed.

After the pointer is set in step 830, process flow moves to step 834 where it is determined if substantially all soft levels, or software interrupt levels, have seen the new buffer. When it is determined that not all soft levels have been seend by the new buffer, then the post-processing of a software interrupt is completed. On the other hand, if it is determined that all soft levels have seen the new buffer, then the indication is that the soft buffer is drained. Accordingly, the waiting resize operation, i.e., the waiting operation in step 808 of FIG. 8A, is signaled by the software interrupt handler in step 838. Once the waiting resize operation is signaled, the post-processing of a software interrupt is completed.

In computing systems which include multiple processors, it may be necessary at times to be able to offline one or more of the processors. That is, a dynamic reconfiguration of a computing system may be needed. When a CPU is soon to be taken off line, the cyclics which are in communication with the CPU, i.e., through a cyclic subsystem, are reassigned, or juggled, to a different CPU. Such juggling may be accomplished without causing cyclic to fire substantially simultaneously on two CPUs, and without spurious firing.

As will be understood by those skilled in the art, a cyclic that is bound to a CPU may not be juggled. Further, a CPU with bound cyclics may not be offlined. When a cyclic is bound to a CPU partition, i.e., bound to a particular group of CPUs, the cyclic is typically only juggled if the specific CPU to which it is bound is offlined or put into a no interrupt state.

Figure 9:
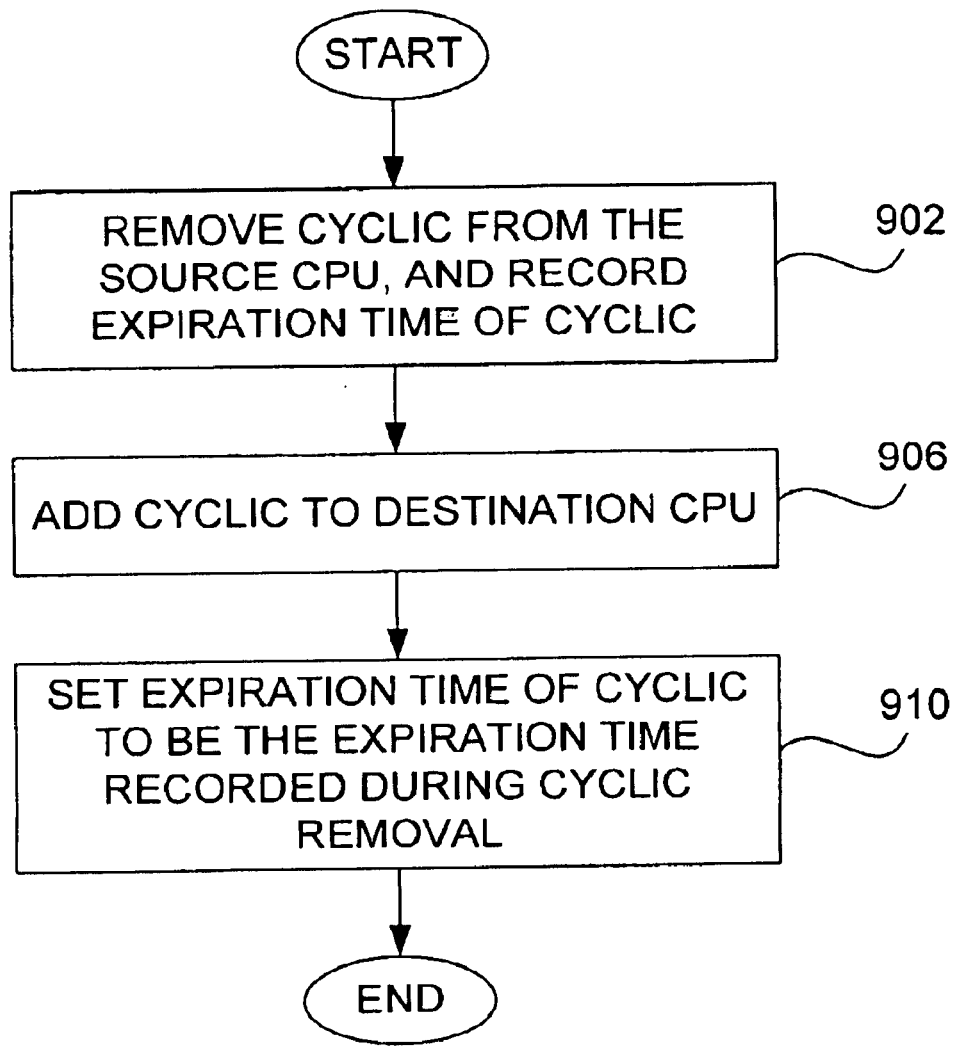
FIG. 9 is a process flow diagram which illustrates the steps associated with a method of juggling cyclic across processors in accordance with an embodiment of the present invention.

With respect to FIG. 9, one process of juggling a cyclic across CPUs will be described in accordance with an embodiment of the present invention. The juggling of the CPUs is possible since timestamp registers are synchronized across CPUs. When a CPU is to be taken offline, a juggling process of a cyclic that is in communication with the CPU, i.e., the source CPU, begins at step 902 in which the cyclic is removed from the source CPU. During the removal process, the expiration time of the cyclic is recorded, or otherwise stored, as for example in step 706 of FIG. 7. Once the cyclic is removed, the cyclic is added to a different, or destination CPU, in step 906.

After the cyclic is added to the destination CPU, the expiration time of the cyclic is set in step 910 to be the expiration time recorded during the removal of the cyclic from the source CPU. Once the cyclic is added to the destination CPU, the process of juggling a cyclic is completed. It should be understood that in some cases, it may not be possible for the cyclic to be removed from the source CPU. In such cases, the juggling process fails.

A computer system which allows for arbitrary resolution timeout intervals to be implemented may be widely varied.

Figure 10:
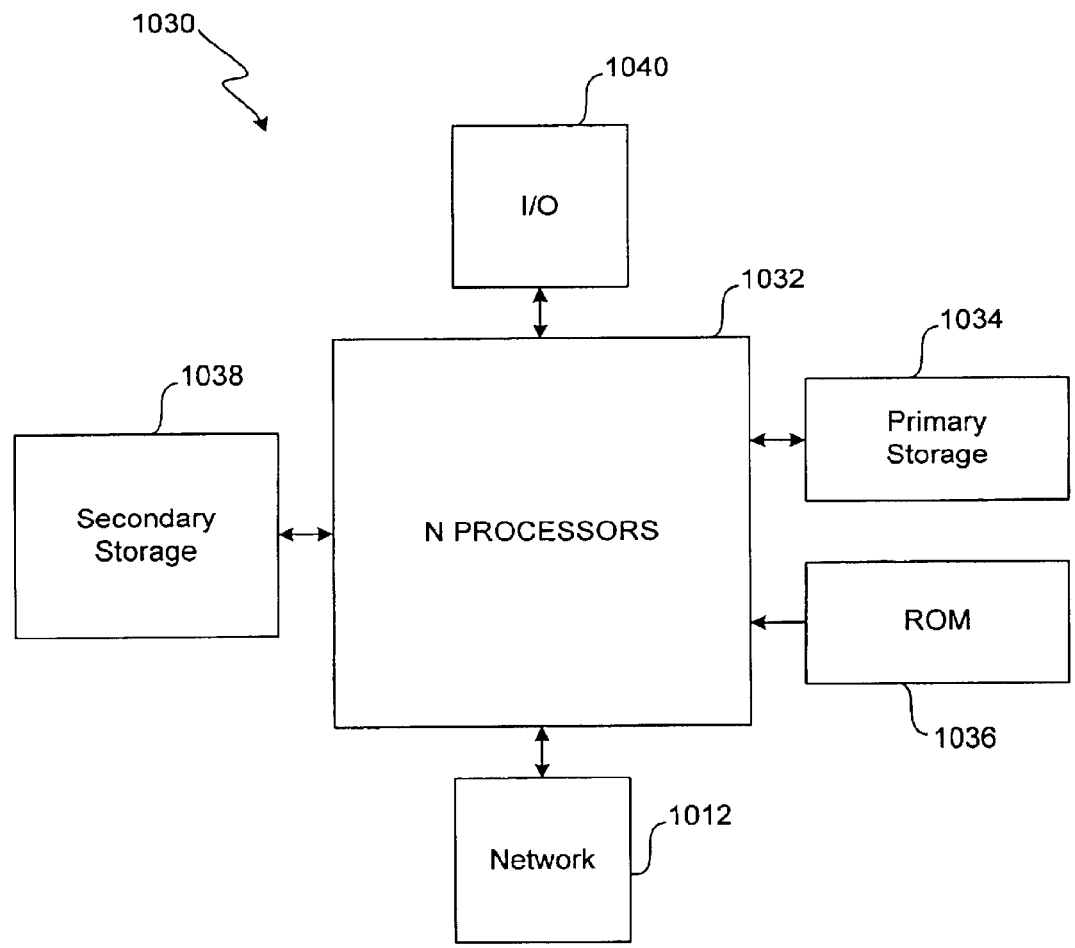
FIG. 10 is a diagrammatic representation of a computer system that is suitable for implementing the present invention.

Substantially any computer system, e.g., a computer system which supports a Solaris™ system, that enables a system clock to communicate with a CPU through a cyclic subsystem may be used. FIG. 10 illustrates a typical, general purpose computer system suitable for implementing the present invention. The computer system 1030 includes any number of processors 1032, e.g., CPUs, that are coupled to memory devices including primary storage devices 1034 (typically a random access memory, or RAM) and primary storage devices 1036 (typically a read only memory, or ROM). As is well known in the art, ROM acts to transfer data and instructions uni-directionally to the CPU 1032, while RAM is used typically to transfer data and instructions in a bi-directional manner. CPU 1032 may generally include any number of processors. Both primary storage devices 1034, 1036 may include any suitable computer-readable media.

A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. In one embodiment, mass memory device 1038 may store computer code and data that is associated with a cyclic subsystem, e.g., cyclic subsystem 250 of FIG. 2. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Such input/output devices 1040 may generally include the cyclics of the present invention. In one embodiment, input/output devices 1040 include interfaces with device drivers, a system clock, and a cyclic subsystem. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the invention. By way of example, while the resizing of a cyclics array, a heap array, or a producer/consumer buffer has generally been described in terms of increasing the size of the arrays or the buffer, in some situations, resizing may involve decreasing the size of the arrays or the buffer. For instance, when dynamic memory space is limited, the arrays or the buffer may be downsized in order to free up memory for other uses.

While the size of arrays or buffers is generally doubled when it becomes necessary or desirable to increase the size of the arrays or buffers, the amount of increase may vary depending upon the requirements of a particular system. That is, in some embodiments, the size of arrays or buffers may be increased by more than one hundred percent. Alternatively, in other embodiments, the size of arrays may be increased by less than one hundred percent.

In general, the steps associated with the various methods involved in implementing a system for arbitrary resolution timeouts may vary. Steps may be changed, reordered, added, and removed without departing from the spirit or the scope of the present invention. By way of example, the steps associated with responding to the firing of an interrupt source may include determining how much time has elapsed since a cyclic has expired. Alternately, the derivation of a new expiration time during a response to the firing of an interrupt source may be accomplished using substantially any suitable method.

The resizing of a producer/consumer buffer is generally serialized system-wide. That is, resize operations are typically serialized across a computing system such that resize operations may not occur simultaneously. However, for a system in which resizes are not serialized, the process of resizing a producer/consumer buffer may be modified to account for potential simultaneous resizes without departing from the spirit or the scope of the present invention.

A heap array, e.g., heap array 350 of FIGS. 3A–C, has generally been shown as including a total of eight elements, five of which are associated with existing nodes and three of which are associated with a freelist. It should be appreciated, however, that a heap array may include any number of elements depending upon the requirements of a particular system without departing from the spirit or the scope of the present invention.

A compare and swap operation may typically involve comparing values and swapping the values if the comparison of the values is favorable, as described above with respect to FIG. 6. In some embodiments, however, a compare and swap operation may be replaced by an atomic operation which substantially only compares values. For example, when a comparison between two values is favorable, e.g., the values are equal, it may not be necessary to perform a swap between the two values. Alternatively, a compare and swap operation may be replaced with a load-linked operation or a store-conditional operation.

In addition, the atomic decrementing of a pending count has been described as being part of a compare and swap operation. It should be appreciated, though, that the decrementing of a pending count may instead be a separate operation. Specifically, the decrementing of a pending count may be separate from a compare and swap operation.

Each software interrupt level has been described as potentially including the implementation of a hard producer/consumer buffer and a soft producer/consumer buffer. In particular, the use of up to two producer/consumer buffers per software interrupt level has been described. However, in some embodiments, a single buffer may be used for each software interrupt level. In other embodiments, buffers may be shared between software interrupt levels, or each software interrupt level may include more than two producer/consumer buffers. Alternatively, the number of buffers shared or associated with each software interrupt level of a system may vary without departing from the spirit or the scope of the present invention. Therefore, the present examples are to be considered as illustrative and not restrictive, and the invention is not to be limited to the details given herein, but may be modified within the scope of the appended claims.

What is claimed is:

1. A computer-implemented method for enabling a device driver to communicate with a processor associated with a computing system including an operating system having a kernel, the computer-implemented method comprising:

exchanging information between the device driver and a clock system;

exchanging information between the clock system and a cyclic system, the cyclic system being a component of the operating system kernel, the cyclic system maintaining a queue of cyclics including expiration times associated with the cyclics; and exchanging information between the cyclic system and the processor, wherein the clock system does not directly exchange information with the processor.

2. A computer-implemented method as recited in claim 1 wherein the clock system includes a callout system and a system clock, and exchanging information between the device driver and the clock system includes:

exchanging information between the system clock and the callout system; and exchanging information between the callout system and the device driver.

3. A computer-implemented method as recited in claim 2 further including:

executing a first cyclic using the cyclic system.

4. A computer-implemented method as recited in claim 3 further including firing an interrupt source, wherein executing the cyclic occurs after the interrupt source fires.

5. A computer-implemented method as recited in claim 4 wherein the interrupt source is a timestamp-based, high-level interrupt source.

6. A computer-implemented method as recited in claim 2 wherein the cyclic system includes an associated heap, the heap including a plurality of cyclics, the computer-implemented method further including:

processing the heap to identify a cyclic that has an unexpired expiration time, the cyclic being included in the plurality of cyclics.

7. A computer-implemented method as recited in claim 2 wherein the cyclic system includes an associated heap, the heap including a plurality of cyclics, the computer-implemented method further including:

performing a downheaping operation on the heap, wherein the downheaping operation is arranged to identify a first cyclic selected from the plurality of cyclics, the first cyclic having a more imminent expiration time than other cyclics included in the plurality of cyclics.

8. A computer-implemented method as recited in claim 7 wherein the plurality of cyclics includes pending cyclics, the pending cyclics being arranged to be referenced in a data structure.

9. A computer-implemented method as recited in claim 8 further including:

identifying a first pending cyclic selected from the plurality of cyclics, the first pending cyclic being referenced in the data structure;

decrementing a pending count associated with the first pending cyclic;

dequeuing the first pending cyclic from the data structure when the pending count has a substantially zero value.

10. A computer-implemented method as recited in claim 9 further including:

calling a handler associated with the first pending cyclic when the first pending cyclic is identified, wherein calling the handler includes decrementing the pending count; and recalling the handler when the pending count has a non-zero value.

11. A computer-implemented method as recited in claim 2 further including:

processing a lock-free software interrupt, wherein processing the lock-free software interrupt includes calling a handler associated with a cyclic.

12. A computer-implemented method as recited in claim 2 further including:

generating a clock interrupt using the cyclic system and the clock system.

13. A computer-implemented method as recited in claim 2 further including:

generating multiple clock interrupts using the cyclic system and the clock system, wherein the multiple clock interrupts may be generated at substantially any interval.

14. A computing system, the computing system including:

a first central processing unit;

a memory, the memory being in communication with the first central processing unit, wherein the memory includes a data structure;

an operating system having a kernel;

a cyclic system that is a part of the operating system kernel, the cyclic system being in communication with the first central processing unit, the cyclic system being arranged to maintain a queue of cyclics including expiration times associated with the cyclics;

a clock system, the clock system being in substantially direct communication with the cyclic system, wherein the clock system is not arranged to communicate directly with the first central processing unit; and a device driver, the device driver being arranged to communicate with the clock system.

15. A computing system according to claim 14 wherein the data structure is arranged to reference the cyclics.

16. A computing system according to claim 14 wherein the clock system is a client of the cyclic system.

17. A computing system according to claim 14 wherein the clock system includes a system clock and a callout subsystem.

18. A computing system according to claim 14 further including at least a second central processing unit.

19. A computer program product for enabling a device driver to communicate with a processor associated with a computing system, the computer program product comprising:

computer operating system code, the computer operating system code including operating system kernel code;

computer code for exchanging information between the device driver and a clock system;

computer code for exchanging information between the clock system and a cyclic system, the cyclic system being part of the operating system kernel code, the cyclic system maintaining a queue of cyclics including expiration times associated with the cyclics; and computer code for exchanging information between the cyclic system and the processor, wherein the clock system does not directly exchange information with the processor.

20. A program product according to claim 19 wherein the computer code for exchanging information between the clock system and the cyclic system and the computer code for exchanging information between the device driver and the clock system includes:

computer code for exchanging information between a system clock of the clock system and a callout system of the clock system; and computer code for exchanging information between the callout system and the device driver.

21. A computer program product according to claim 20 further including:

computer code for processing a lock-free software interrupt, wherein the computer code for processing the lock-free software interrupt includes computer code for calling a handler associated with a cyclic.

22. A computer program product according to claim 20 further including:

computer code for generating a clock interrupt using the cyclic system and the clock system.

23. A computer program product according to claim 20 wherein the cyclic system includes an associated heap, the heap including a plurality of cyclics, the computer program product further including:

computer code for performing a downheaping operation on the heap, wherein the downheaping operation is arranged to identify a first cyclic selected from the plurality of cyclics, the first cyclic having a more imminent expiration time than other cyclics included in the plurality of cyclics.

24. A computer-implemented method for enabling a device driver to communicate with a processor associated with a computing system through a cyclic system that is a part of a kernel of an operating system that is arranged to execute on the computing system, the cyclic system maintaining a queue of cyclics including expiration times associated with the cyclics, the computer-implemented method comprising:

exchanging information between a clock system and the cyclic system;

exchanging information between the cyclic system and the processor, wherein the clock system does not directly exchange information with the processor; and implementing arbitrary resolution timeouts using the clock system and the cyclic system, wherein the arbitrary resolution timeouts are implemented using a timestamp-compare register of the computing system and are arranged to be used by the device driver.

25. A computer-implemented method for enabling a device driver to communicate with a processor associated with a computing system through a cyclic system that is a part of a kernel of an operating system that is arranged to execute on the computing system, the cyclic system maintaining a queue of cyclics including expiration times associated with the cyclics, the computer-implemented method comprising:

sending information from a plurality of device driver to a clock system; the plurality of device drivers being respectively associated with a plurality of devices in the computing system;

forwarding the information from the clock system to the cyclic system; and exchanging the information between the cyclic system and the processor, the cyclic system providing a plurality of cyclics that are each respectively associated at least one of the plurality of devices; and wherein the clock system does not directly exchange information with the processor;

thereby allowing the device driver to communicate with processor via the cyclic system.

26. A computer-implemented method as recited in claim 25, wherein the plurality of cyclics are provided as a heap that is arranged as a tree in accordance with expiration time of the cyclics.

* * * * *